(12) United States Patent
Brad

(10) Patent No.: US 8,965,933 B2
(45) Date of Patent: Feb. 24, 2015

(54) MULTI-TIERED CACHES IN DATA RENDERING

(71) Applicant: Apple Inc., Cupertino, CA (US)

(72) Inventor: Vladimir Brad, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 13/631,255

(22) Filed: Sep. 28, 2012

(65) Prior Publication Data

US 2013/0179471 A1  Jul. 11, 2013

Related U.S. Application Data

(60) Provisional application No. 61/583,861, filed on Jan. 6, 2012.

(51) Int. Cl.
*G06F 17/30* (2006.01)

(52) U.S. Cl.
USPC .......................................................... 707/796

(58) Field of Classification Search
CPC ..................... G06F 17/30091; G06F 17/30132
USPC .................................. 707/736, 793, 796, 802
See application file for complete search history.

(56) References Cited

U.S. PATENT DOCUMENTS

| | | | |
|---|---|---|---|
| 6,795,072 B1 | 9/2004 | Lewis | |
| 7,348,986 B2 | 3/2008 | Doyle et al. | |
| 7,406,660 B1 * | 7/2008 | Sikchi et al. | 715/236 |
| 7,760,804 B2 | 7/2010 | Ruttenberg et al. | |
| 7,924,287 B2 | 4/2011 | Blythe et al. | |
| 8,214,387 B2 * | 7/2012 | King et al. | 707/770 |
| 8,250,026 B2 * | 8/2012 | Mok et al. | 707/602 |
| 2003/0095135 A1 * | 5/2003 | Kaasila et al. | 345/613 |
| 2004/0075641 A1 * | 4/2004 | Widdowson | 345/156 |
| 2004/0246502 A1 * | 12/2004 | Jacobsen et al. | 358/1.1 |
| 2006/0047804 A1 * | 3/2006 | Fredricksen et al. | 709/224 |
| 2008/0126402 A1 * | 5/2008 | Sikchi et al. | 707/102 |
| 2010/0162126 A1 * | 6/2010 | Donaldson et al. | 715/738 |
| 2011/0095885 A9 * | 4/2011 | Nielsen et al. | 340/540 |
| 2011/0181912 A1 | 7/2011 | Miyata et al. | |
| 2011/0314392 A1 * | 12/2011 | Howarth | 715/753 |
| 2012/0102432 A1 * | 4/2012 | Breedvelt-Schouten et al. | 715/823 |
| 2012/0144333 A1 * | 6/2012 | Shatalin et al. | 715/771 |

\* cited by examiner

*Primary Examiner* — Cam-Linh Nguyen

(74) *Attorney, Agent, or Firm* — Fish & Richardson P.C.

(57) ABSTRACT

Methods, program products, and systems for rendering data using multi-tiered caches are described. A system can render a first section of data and store the rendered first section of data in a first tier cache. The system can determine that a data field, when rendered, straddles the rendering of the first section of data and a rendering of a second section of data. The system can generate a rendering of the data field and store the rendering of the data field in a second tier cache. When rendering the second section of data, the system can use the rendered data field stored in the second tier cache instead of regenerating the rendering of the data field.

21 Claims, 8 Drawing Sheets

MULTI-TIERED CACHES IN DATA RENDERING

CROSS REFERENCE TO RELATED CASES

This application is a non-provisional of U.S. Patent Application Ser. No. 61/583,861, entitled "MULTI-TIERED CACHES IN DATA RENDERING", filed on Jan. 6, 2012, which is hereby incorporated by reference in its entirety.

TECHNICAL FIELD

This disclosure relates generally to database application programs on a mobile device.

BACKGROUND

A mobile device, such as a smart phone, can execute an application program that access one or more data stores. The application program can include, for example, a database reporting program that is configured to display a formatted view of data stored in the one or more data stores, or a database editing program that is configured to update the data in the one or more data stores. The data stores can be hosted on server computers that are located remotely from the mobile device. For the application program to access the data stores, the mobile device can utilize one or more connections to the data stores through a communications network.

The application program can generate a data report to be displayed on a display screen of the mobile device. The display screen may not be sufficiently large to display the data report in the entirety. For example, the data report can include hundreds or thousands of rows or columns of data. At any given time, the display screen can only legibly display a portion of the rows of data of the data report. A user interface item (e.g., a "previous page" button and a "next page" button) can be utilized to allow a user to browse through the data report.

SUMMARY

Methods, program products, and systems for rendering data using multi-tiered caches are described. A system can render a first section of data and store the rendered first section of data in a first tier cache. The system can determine that a data field, when rendered, straddles the rendering of the first section of data and a rendering of a second section of data. The system can generate a rendering of the data field and store the rendering of the data field in a second tier cache. When rendering the second section of data, the system can use the rendered data field stored in the second tier cache instead of regenerating the rendering of the data field.

Multi-tiered caches can be implemented to achieve the following advantages. Multi-tiered caches can allow a user to seamlessly scroll through a large data report on a mobile device, even when the data report is not stored in memory in the entirety. When a user scrolls through the large data report, the user can experience scrolling through the entire data report, rather than viewing the data report page by page. Transitions between display buffers can occur automatically and smoothly. The entire data report need not be formatted at once and stored in memory, thus saving computing resources of the mobile device.

The mobile device can retrieve data from a remote data store in segments rather than retrieving data all at once or retrieving a new data record whenever a new row of data enter a display window. Thus, the bandwidth of data communications between the mobile device and the data store can be utilized efficiently.

Creating display content of a second display buffer before a scroll window actually reaches the display content of the second display buffer can provide smooth transitions from one display buffer to another. Due to the efficient use of data communication bandwidth and the smooth transition, a user can have a better experience browsing a large data report generated from data in a remote data store using a multi-tiered caches than using conventional technologies The details of one or more implementations of multi-tiered caches are set forth in the accompanying drawings and the description below. Other features, aspects, and advantages of multi-tiered caches will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
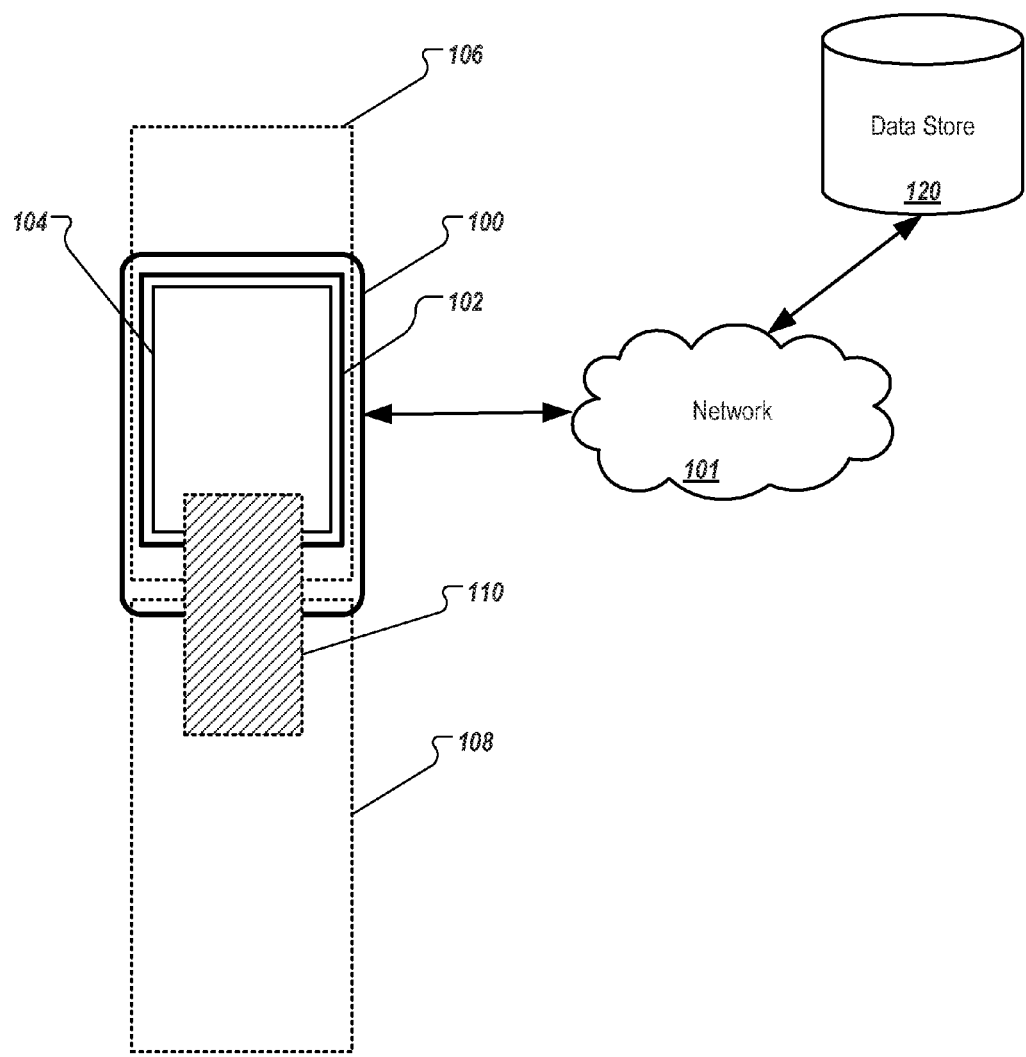
FIG. 1 illustrates exemplary data chunking using multi-tiered caches.

FIG. 1 illustrates exemplary data chunking using multi-tiered caches. Mobile device 100 can use a multi-tiered caches to improve display speed when data chunking is used. Data chunking is a technique that includes displaying a large body of content in segments, or chunks, using multiple display buffers.

The display content can include a portion of a data report. The data report can include formatted data records produced by an exemplary application program executing on mobile device 100. A data record can be a unit of data. A formatted data record can be a data record that is given specific display characteristics, e.g., width, height, font size, space above, and space below. The exemplary application program can be a database reporting program or a database editing program. The application program can retrieve data from data store 120. Data store 120 can be a local data store hosted on mobile device 100, or a data store hosted remotely from mobile device 100. In this example, data store 120 can be a remote data store connected to mobile device 100 through a wired or wireless communications network 101. The application program can create the data report by formatting the retrieved data.

The data report created by the application program, in the entirety, may not fit on a single display screen. The data report can include data retrieved using various selection criteria. Multiple data records in data store 120 can satisfy the selection criteria. A data set that includes all data records that satisfy the selection criteria can be large when formatted, compared to what can be displayed on a single display screen 102 at one time. For example, the application program can create an employee/sales revenue report that can include hundreds or thousands of rows. Due to limitation by a physical size of display screen 102, not all formatted data records can be displayed at once. Accordingly, mobile device 100 can determine to retrieve and format the data records a segment at a time.

Mobile device 100 can segment the data report of the application program into multiple segments or chunks. Each segment of the data report can include a portion of a formatted data record (e.g., a portion of a large text body), a formatted data record in the entirety, or multiple formatted data records. Each segment of the data report can be stored in a display buffer as display content. The display buffer can include a section of memory or other storage device. The display buffer (e.g., display buffer 106) can have a size (e.g., 10,000 pixels in height) that is larger at least in one dimension than a size of display screen 102 (e.g., 640 pixels in height for a smart phone, or 1024 pixels in height for a tablet device).

Mobile device 100 can provide scrollable window 104 that corresponds in size with display screen 102. Scrollable window 104 can be a portion of display buffer 106 that is currently being displayed on display screen 102. Scrollable window 104 can respond to a user input (e.g., a gesture on a touch-sensitive display device) and scroll up or down, left or right, or in another direction, according to a direction of the input. When scrollable window 104 scrolls within the boundaries of display buffer 106, e.g., between an upper boundary and a lower boundary, if the scrolling is vertical, mobile device 100 can provide display content in display buffer 106 for display without having to retrieve more data records from data store 120 or from a local cache or formatting the data records.

When mobile device 100 determines that scrollable window 104 will cross a boundary of display buffer 106, mobile device 100 can create display content for display buffer 108 in anticipation of the crossing. For example, when scrollable window 104 reaches a boundary of display buffer 106, or is proximate to and scrolls towards the boundary of display buffer 106, mobile device 100 can create display content of display buffer 108, including retrieving more data records and formatting the retrieved data records. The display content in display buffer 106 and the display content in display buffer 108 can be neighboring portions of a same data report. The display content in display buffer 106 and 108 can border one another at the boundary.

In some implementations, mobile device 100 can retrieve all data records that satisfy the selection criteria, and store the retrieved data records, or formatted data records, in a data storage space. Mobile device 100 can retrieve data stored in the data storage space and format the retrieved data, if the data have not been already formatted, to create display content of display buffers 106 and 108 without further accessing data store 120. Mobile device 100 can store a rendering of a section of the data in display buffer 106. A rendering of a section of the data can include the section of data formatted according to a layout and stored in a display buffer in a format, e.g., bitmap format, that is ready for display. Mobile device 100 can create renderings of sections data on an as-needed basis. For example, mobile device 100 can generate a rendering of data and store the rendering in display buffer 108 only when mobile device 100 determines that a user is going to access the rendering in display buffer 108 soon. Display buffers 106 and 108 are first tier caches.

A data field, when formatted, may not perfectly fit in a single display buffer. For example, data field 110, when formatted, can be a rectangle having a width and height. The rectangle can straddle multiple display buffers. A portion of data field 110, when rendered, e.g., formatted and stored in a form ready for display, can be stored in display buffer 106. Another portion of data field 110, when rendered, can be stored in display buffer 108. When mobile device 100 creates display content of display buffers 106, mobile device 100 can identify data field 110, which is partially inside display buffer 106. Mobile device 100 can format data field 110 to create a rendering of data field 110 and store the rendering of data field 110 in a second tier cache. When mobile device 100 generates content in display buffer 108 later, mobile device 100 can utilize a portion of the rendering of data field 110 stored in the second tier cache, rather than formatting data field 110 again.

Mobile device 100 can create a data structure for managing the multi-tiered caches including the first tier cache and second tier cache. Mobile device 100 can create a tree for each first tier cache. For example, mobile device 100 can create a tree in which a representation of display buffer 106 is a root. The second tier cache storing the rendering of data field 110 can be a child node of the root in the tree. Each root can have multiple children nodes, each child node corresponding to a second tier cache.

Based on a location of data field 110, e.g., whether data field 110 is located at the top, bottom, left, or right of display buffer 106, mobile device 100 can identify one or more additional display buffers to which the second tier cache is a child node. For example, data field 110 can be located at the bottom of display buffer 106. Accordingly, data field 110 straddles display buffers 106 and 108. Mobile device 100 can add the second tier buffer, which stores a rendering of data field 110, to a tree in which display buffer 108 is a root. When mobile device adds the second tier buffer to the tree in which display buffer 108 is a root, display buffer 108 may or may not contain a rendering of data.

When mobile device 100 generates a rendering of data for display buffer 108, mobile device 100 need not retrieve data field 110 from data store 120 or reformat data field 110. Instead, mobile device 100 can traverse children nodes of display buffer 108 to identify existing second tier caches. If a second tier cache, e.g., the second tier cache of data field 110 already exists, mobile device can incorporate at least a portion of the rendering in the second tier cache into the rendering of data for storing in display buffer 108.

Tiers Of Caches

Figure 2:
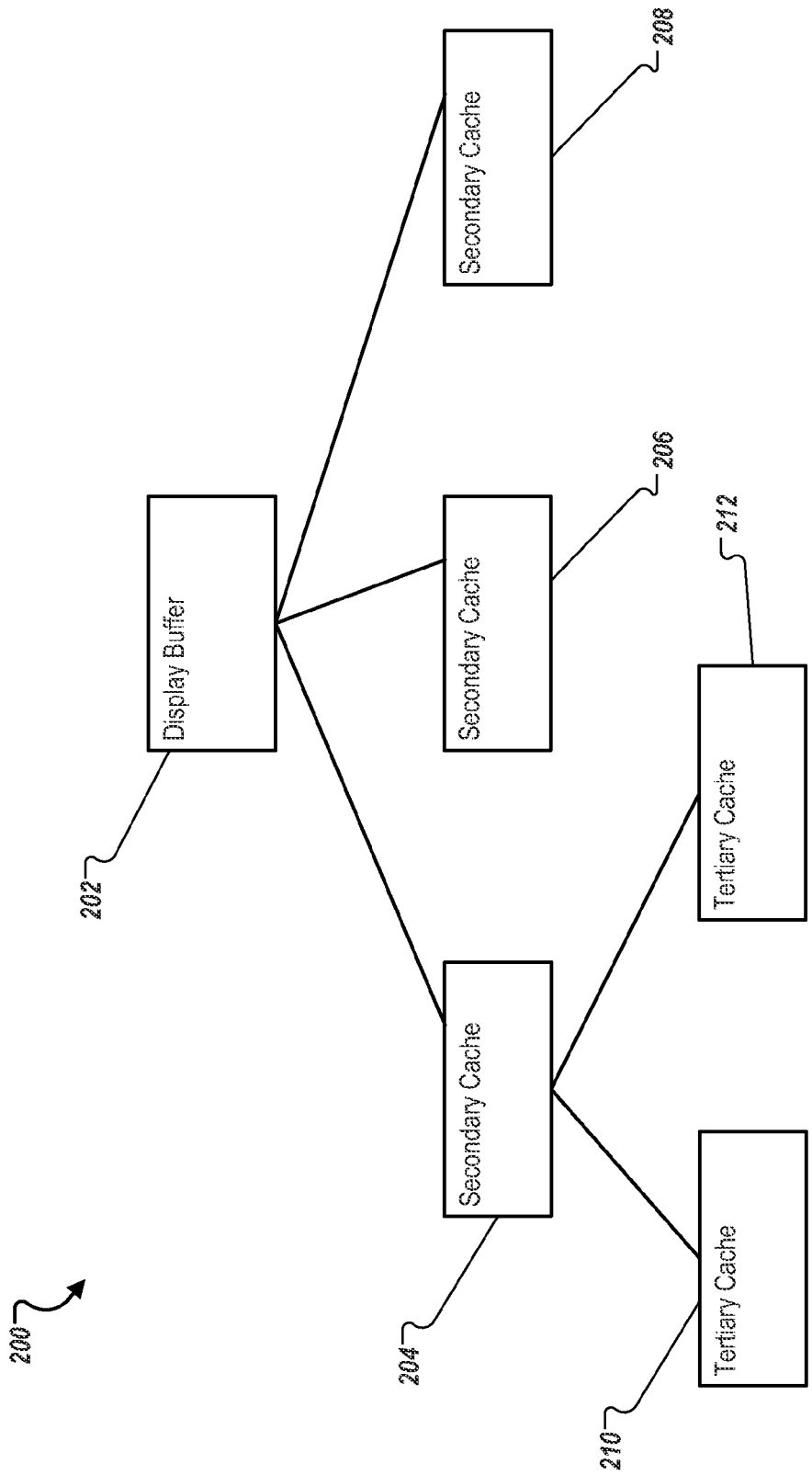
FIG. 2 is tree diagram illustrating exemplary relations between first tier caches and second tier caches.

FIG. 2 is tree diagram illustrating exemplary relations between first tier caches and second tier caches. A system, e.g., mobile device 100, can relate multiple tiers of caches using exemplary tree 200. Tree 200 can include root node 202. Root node 202 can represent a first tier cache, e.g., a display buffer. Root node 202 can have children nodes 204, 206, and 208. Each child node of root node 202 can represent a second tier cache. A second tier cache is a child node of a root node if at least a portion of a rendering of data stored in the second tier cache is part of a rendering of data in the first tier cache represented by the root node. A second tier cache can store a rendering of one or more data fields. For example, the second tier cache represented by node 204 can include two data fields. Child node 204 of root node 202 can have children nodes 210 and 212, each of which representing one of the two data fields.

The system can store multiple trees, each of which having a structure that is similar to tree 200. When the system moves from a first display buffer to a second display buffer, e.g., in response to a user input scrolling a display window, the system can determine if the second display buffer has a child node that includes a rendering of data. If so, the system can render at least a portion of the second display buffer using the content in the second tier cache.

When the system requests an update on content of a second tier cache, e.g., the second tier cache represented by node 204, the system can determine if one or more data fields represented by the children nodes of node 204 is to be updated. The system can minimize the amount of data to be updated by updating only a data field that has changed, e.g., the data field represented by node 210, rather than updating all date fields.

Figure 3:
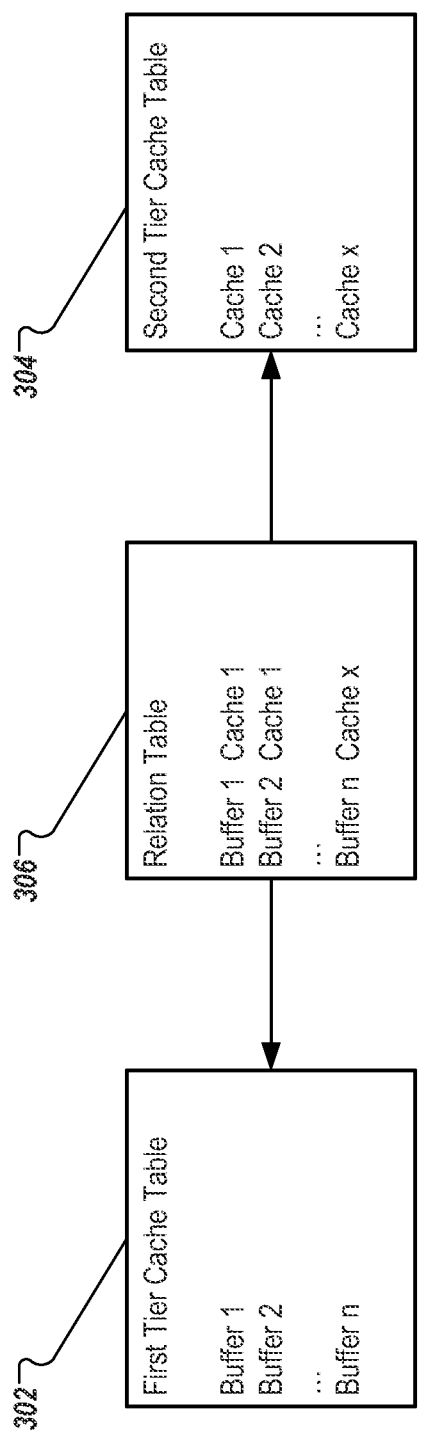
FIG. 3 is a block diagram illustrating an exemplary data structure for relating first tier caches and second tier caches.

FIG. 3 is a block diagram illustrating an exemplary data structure for relating first tier caches and second tier caches. A system utilizing multi-tiered caches can represent caches in different tiers in an n-to-n relationship. For example, a first tier cache can relate to multiple second tier caches, as described above in reference to FIG. 2. Likewise, a second tier cache can relate to multiple first tier caches.

The system can store metadata, e.g., identifiers and geometries, of one or more first tier caches in first tier cache table 302. First tier cache table 302 can be keyed by identifiers of the first tier caches. The system can store metadata of one or more second tier caches in second tier cache table 304. Second tier cache table 304 can be keyed by identifiers of the second tier caches.

The system can store relations between first tier caches and second tier caches in relation table 306. Relation table 306 can have a composite key that includes an identifier of a first tier cache and an identifier of a second tier cache, which are foreign keys to first tier cache table 302 and second tier cache table 304, respectively. When the system updates content displayed on a display screen based on a rendering stored in a first tier cache, the system can traverse relation table 306 to identify all second tier caches that relate to a the first tier cache, or all first tier caches that relate to a given second tier cache. The system can use the relationship to build exemplary tree 200 as described above in reference to FIG. 2

Updating a Cache

Figure 4:
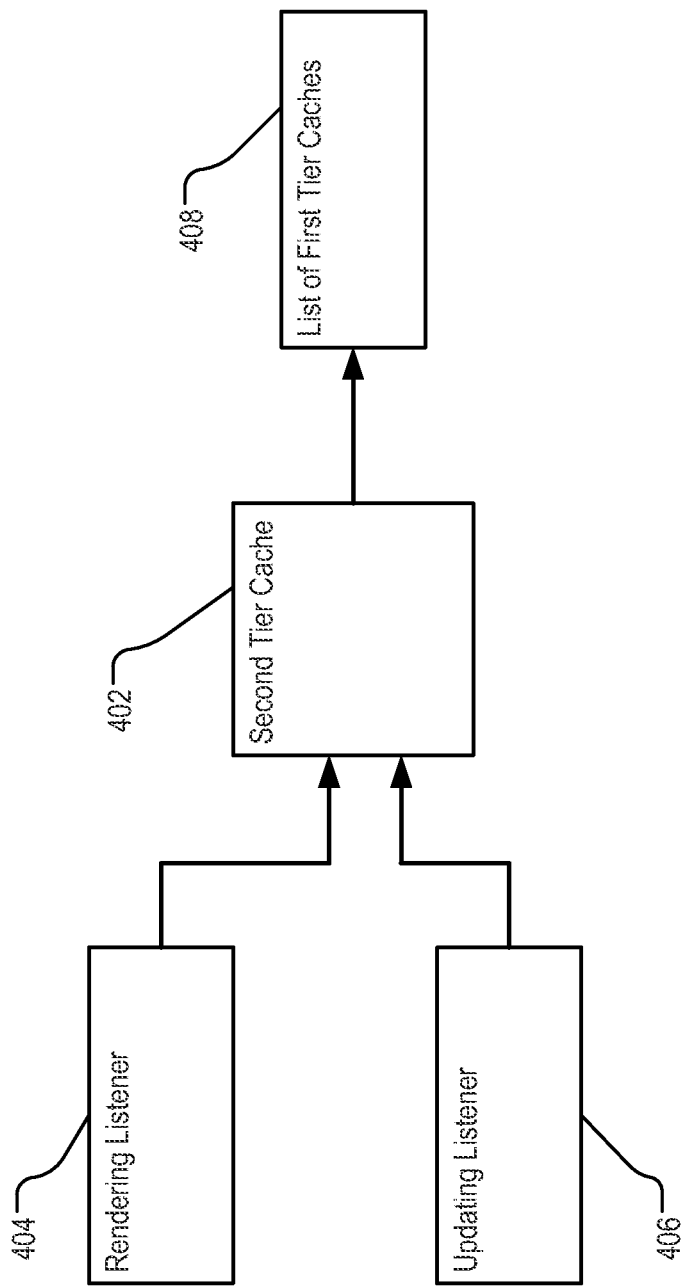
FIG. 4 is block diagram illustrating exemplary techniques for updating a cache.

FIG. 4 is block diagram illustrating exemplary techniques for updating a cache. Lower tier cache 402, e.g., a second tier cache, can be associated with rendering listener 404 and updating listener 406. Rendering listener 404 can be a software component of a system utilizing multi-tiered caches that is configured to cause the system to update lower tier cache 402 when rendering conditions change. Rendering conditions of lower tier cache 402 can change when, due to a change in display geometry, lower tier cache 402 that is originally associated with a group of higher tier caches is associated with a different group of higher tier caches.

For example, lower tier cache 402 can include a data field corresponding to a row of data in a database table. Lower tier cache 402 can straddle a first display buffer and a second display buffer. When a new row of data is inserted before the row of data of lower tier cache 402, lower tier cache 402 can move downward. When lower tier cache 402 moves downwards, the portion of lower tier cache 402 that is in the first display buffer can decrease, and the portion of lower tier cache 402 that is in the second display buffer can increase.

Lower tier cache 402 can move such a distance that lower tier cache 402 is completely inside of the second display buffer and no longer straddles two display buffers. Likewise, when a row of data is deleted before the row of data of lower tier cache 402, lower tier cache 402 can move upward. The system can register data rows that, if changed, can cause lower tier cache 402 to move with rendering listener 404.

The system can maintain list 408 of upper tier caches, e.g., first tier caches. List 408 can be associated with lower tier cache 402. When lower tier cache 402 is to be updated in response to a detection of change of rendering conditions by rendering listener 404, the system can traverse the upper tier caches in list 408 to determine which, if any, upper tier cache needs to be updated. The update can include an update in a structure of a tree in which an upper tier cache is represented by a root node.

In addition to rendering listener 404, lower tier cache 402 can be associated with updating listener 406. Updating listener 404 can be a software component of the system that is configured to cause the system to update lower tier cache 402 when data in lower tier cache 402 change. Data in lower cache 402 can change when, for example, data of a data field that is rendered in lower cache 402 change, causing a height or width of a rendering of the data field to change. Upon detecting a data change, the system can update lower tier cache 402, and traverse the upper tier caches in list 408 to determine which, if any, upper tier cache is to be updated.

Exemplary Data Rendering Processes

Figure 5:
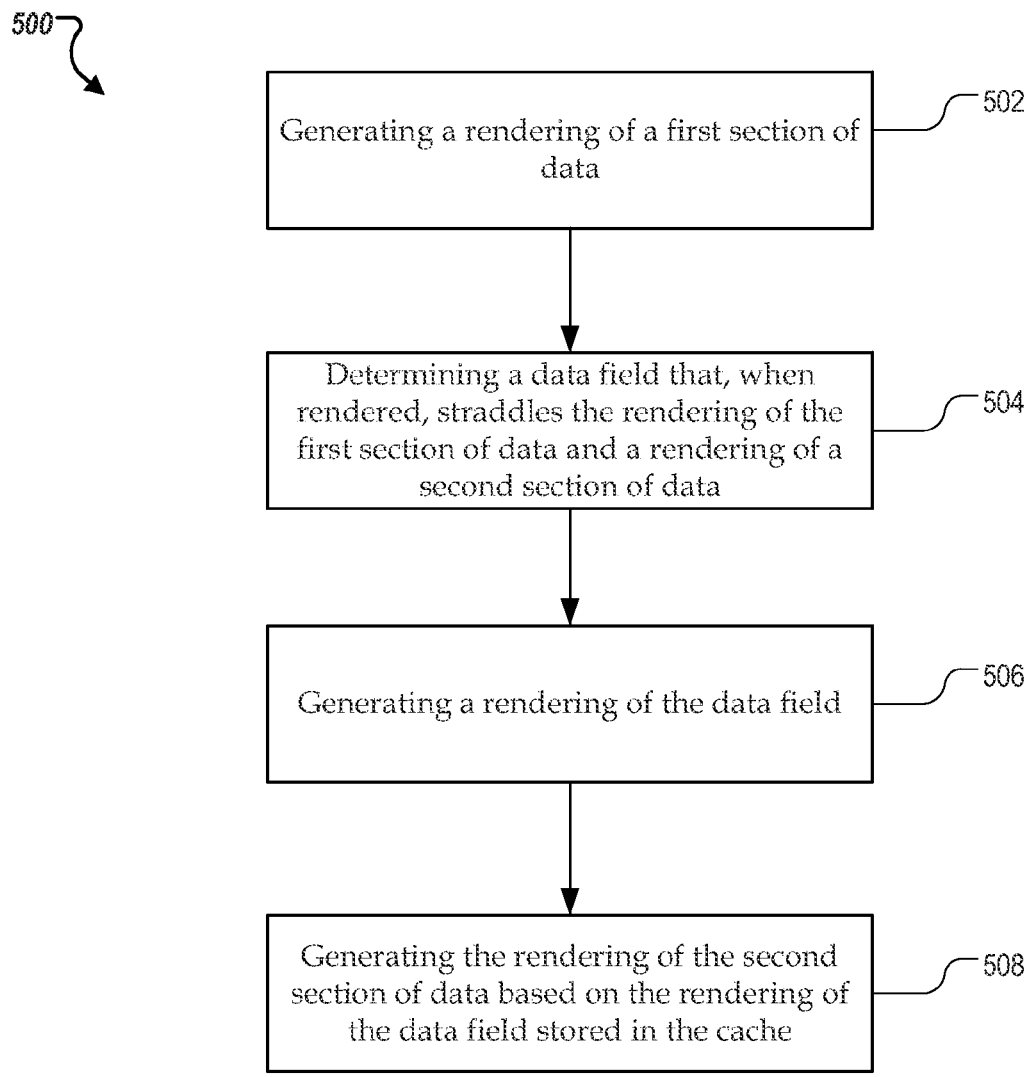
FIG. 5 is a flowchart illustrating an exemplary process of data rendering using multi-tiered caches.

FIG. 5 is a flowchart illustrating an exemplary process 500 of data rendering using multi-tiered caches. A system implementing multi-tier caches can generate (502) a rendering of a first section of data. The data can be a data item retrieved from a database. The rendering of the first section of data can include a portion of the data retrieved from the database that is formatted according to a layout. The layout can include an arrangement of one or more data fields for presentation. The system can format the data for rendering according to the arrangement of a corresponding data field in the layout. The rendering of the first section of data can be a bitmap at least a portion of which can be displayed on a display device. The bitmap can be stored in a first tier cache.

The system can determine (504) a data field that, when rendered, straddles the rendering of the first section of data and a rendering of a second section of data. The data field can be a repeating data field that corresponds to multiple and separate values. Determining the data field that straddles the rendering of the first section of data and the rendering of a second section of data can include determining a geometry of the rendering of the first section of data and a geometry of the rendering of the data field based on data fetched from a database and a layout for formatting the data. The system can then determine, based on the geometry of the rendering of the first section of data and the geometry of the rendering of the data field, that a first portion of the data field, when rendered, is inside the first rendering, and that a second portion of the data field, when rendered, is outside the first rendering.

The system can generate (506) a rendering of the data field separately from the rendering of the first section of data and the rendering of a second section of data. The system can store the generated rendering of the data field in a cache. The cache can be a second tier cache. Storing the generated rendering of the data field can include storing the generated rendering of the data field in a tree data structure that includes multiple nodes in multiple tiers. A parent node in the tree data structure, e.g., a node in a first tier, can represent the rendering of the first section of data. A child node of the parent node, e.g., a node in a second tier, can represent the rendering of the data field.

The system can receive a change in the first section of data. The change can include a change of rendering conditions of the data field. The system can identify the rendering of the data field according to the tree data structure, and update the rendering of the data field according to the change. The system can update a portion of the rendering of the data field that is outside the rendering of the first section of data.

The system can generate (508) the rendering of the second section of data based on the rendering of the data field stored in the cache. In rendering the second section of the data, the system can retrieve data from a database and format the data according to a layout, except the data for the data field, which have already been formatted.

Exemplary System Architecture

Figure 6:
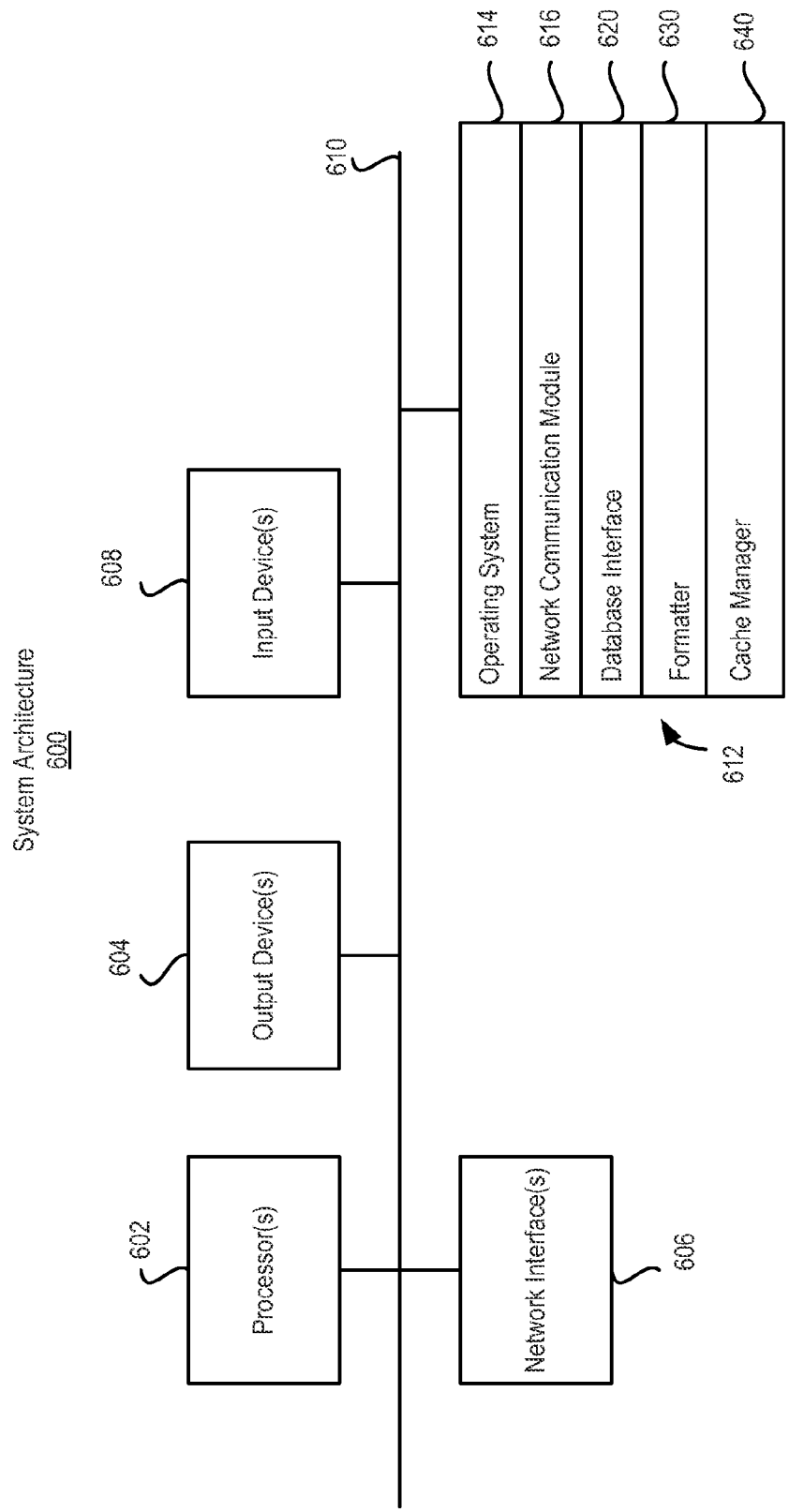
FIG. 6 is a block diagram of an exemplary system architecture for implementing the features and operations of FIGS. 1-5.

FIG. 6 is a block diagram of an exemplary system architecture 600 for implementing the features and operations of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, database interface 620, formatter 630, and cache manager 640. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Database interface 620 can include computer instructions that, when executed, cause processor 602 to establish and manage one or more connections to a database. Processor 602 can retrieve data from the database through the connections. Formatter 630 can include computer instructions that, when executed, cause processor 602 to format one or more data fields according to a layout. Cache manager 640 can include computer instructions that, when executed, cause processor 602 to manage tiers of caches for rendering data.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Figure 7:
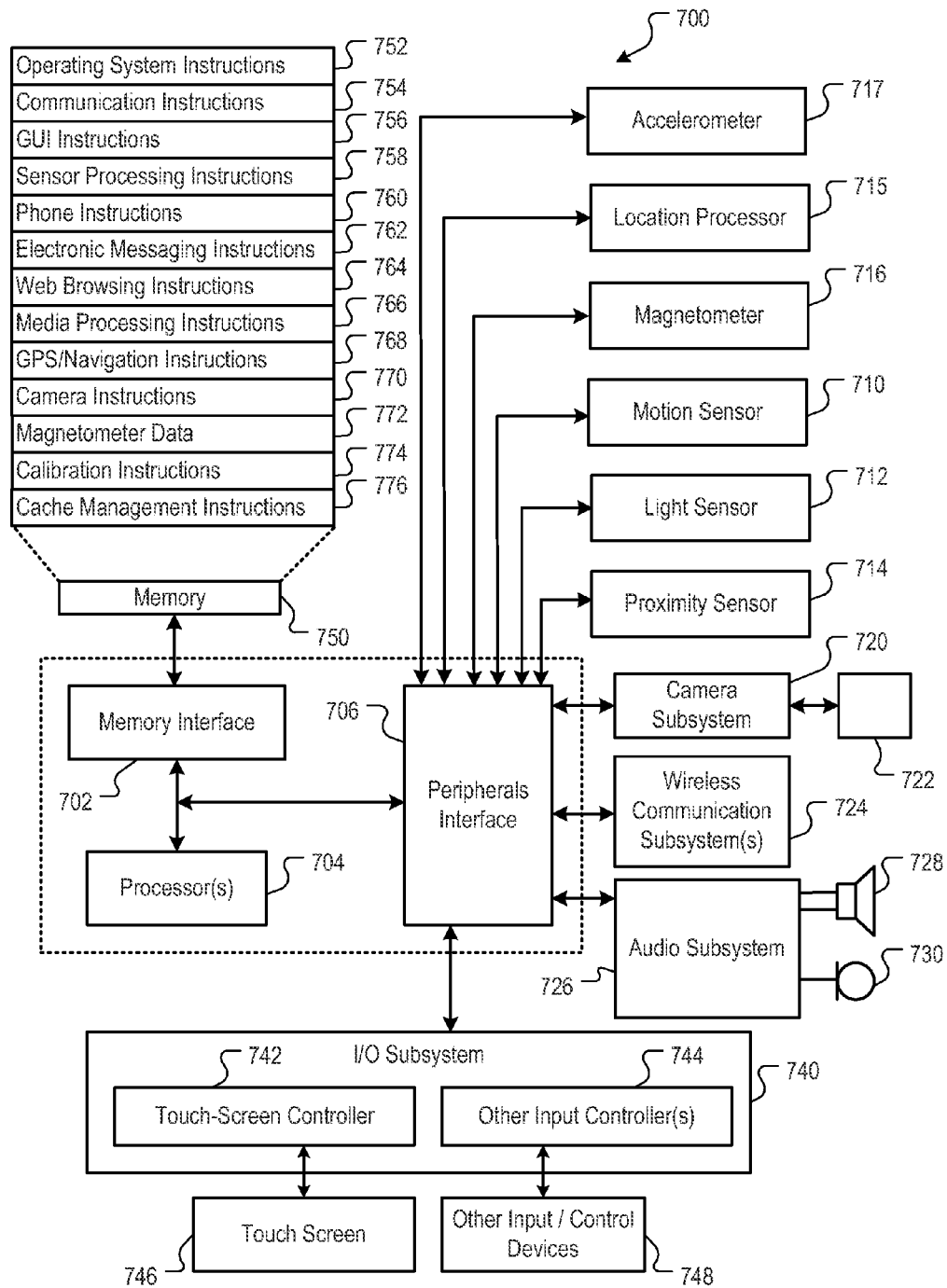
FIG. 7 is a block diagram illustrating an exemplary device architecture of a mobile device implementing the features and operations of FIGS. 1-5.

FIG. 7 is a block diagram of an exemplary architecture 700 for a mobile device implementing the features and operations of FIGS. 1-5. A mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors (APs) and baseband processors (BPs). The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communications network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™ Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include data cache management instructions 776 configured to cause, when activated, one or more processors 704 to manage tiers of caches for rendering data.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
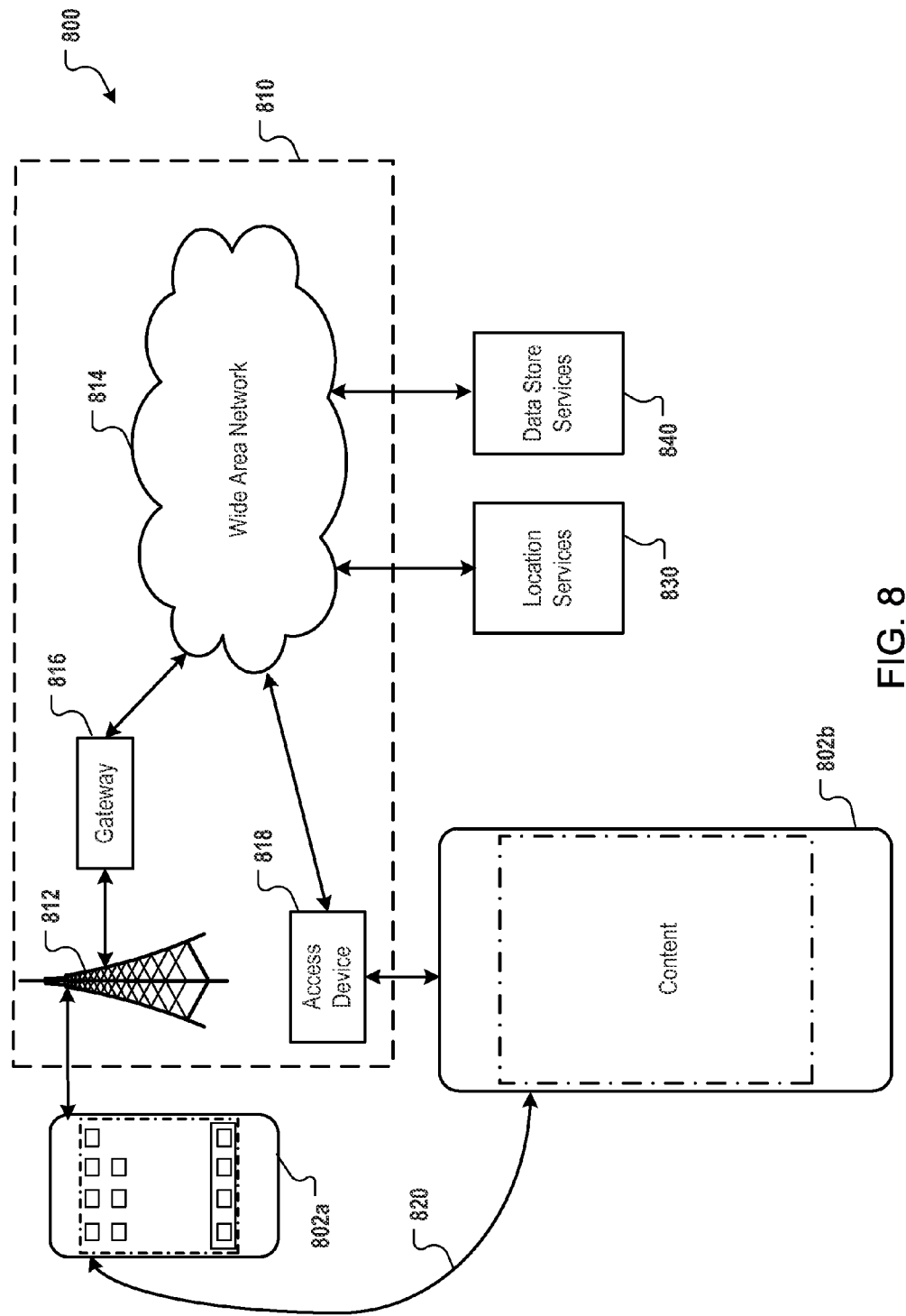
FIG. 8 is a block diagram of an exemplary network operating environment for the mobile devices implementing features and operations of FIGS. 1-5.

FIG. 8 is a block diagram of an exemplary network operating environment 800 for mobile devices implementing the features and operations of FIGS. 1-5. Mobile devices 802*a* and 802*b* can be mobile device such as mobile device 100 of FIG. 1. Mobile devices 802*a* and 802*b* can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802*b* can place and receive phone calls, send and receive e-mail messages, and retrieve electronic documents over the access device 818 and the wide area network 814. In some implementations, mobile device 802*a* or 802*b* can be physically connected to the access device 818 using one or more cables and the access device 818 can be a personal computer. In this configuration, mobile device 802*a* or 802*b* can be referred to as a "tethered" device.

Mobile devices 802*a* and 802*b* can also establish communications by other means. For example, wireless device 802*a* can communicate with other wireless devices, e.g., other mobile devices 802*a* or 802*b*, cell phones, etc., over the wireless network 812. Likewise, mobile devices 802*a* and 802*b* can establish peer-to-peer communications 820, e.g., a personal area network, by use of one or more communication subsystems, such as the Bluetooth™ communication devices. Other communication protocols and topologies can also be implemented.

The mobile device 802*a* or 802*b* can, for example, communicate with one or more services 830 and 840 over the one or more wired and/or wireless networks. For example, one or more location services 830 can determine one or more location identifiers of wireless access gateways (cell towers or wireless access points) and latitude and longitude coordinates associated with the location identifiers, and provide the one or more location identifiers to mobile devices 802*a* and 802*b* for determining current locations mobile devices 802*a* and 802*b* using the location identifiers. One or more data store services 840 can provide data services including shared data services. The data store services 840 can include service of providing data and layout for formatting the data.

Mobile device 802*a* or 802*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 802*a* or 802*b*. Such access can be provided by invocation of a web browsing function or application (e.g., a browser) in response to a user touching, for example, a Web object.

A number of implementations of the subject matter have been described. Nevertheless, it will be understood that various modifications can be made without departing from the spirit and scope of the invention.

What is claimed is:

1. A method comprising:
generating, by one or more computing devices, a rendering of a first section of data and storing the rendering of the first section of data in a first data buffer;
determining, by the one or more computing devices, a data field that, when rendered, straddles the rendering of the first section of data and a rendering of a second section of data that will be stored in a second data buffer, the data field, when rendered, including a first portion and a second portion, wherein determining that the data field straddles the renderings includes determining that the first portion of the data field, when rendered, is stored in the first data buffer and that the second portion of the data field, when rendered, will be stored in the second data buffer;

generating, by the one or more computing devices, a rendering of the data field separately from the rendering of the first section of data and the rendering of a second section of data and storing a rendered first portion of the data field and a rendered second portion of the data field in a cache; and generating, by the one or more computing devices, the rendering of the second section of data, including at least storing the rendered second portion of the data field, as stored in the cache, in the second data buffer.

2. The method of claim 1, wherein each of the rendering of the first section of data and the rendering of the second section of data includes a bitmap.

3. The method of claim 1, wherein generating the rendering of the first section of data comprises:
retrieving a data item from a database; and
formatting the data item according to a layout, wherein:
the layout comprises an arrangement of one or more data fields for presentation; and
formatting the data item comprises formatting the data item for rendering according to the arrangement of a corresponding data field in the layout.

4. The method of claim 1, wherein determining the data field that straddles the rendering of the first section of data and the rendering of a second section of data comprises:
determining a geometry of the rendering of the first section of data and a geometry of the rendering of the data field based on data fetched from a database and a layout for formatting the data; and
determining, based on the geometry of the rendering of the first section of data and the geometry of the rendering of the data field, that the first portion of the data field, when rendered, is inside the first rendering, and that the second portion of the data field, when rendered, is outside the first rendering and is inside the second rendering.

5. The method of claim 1, wherein the data field is a repeating data field that corresponds to multiple and separate values.

6. The method of claim 1, wherein storing the generated rendering of the data field comprises storing the generated rendering of the data field in a tree data structure that includes a plurality of nodes, wherein a parent node in the tree data structure represents the rendering of the first section of data, and a child node of the parent node represents the rendering of the data field.

7. The method of claim 6, comprising:
receiving a change in the first section of data;
identifying the rendering of the data field according to the tree data structure; and
updating the rendering of the data field according to the change, including updating a portion of the rendering of the data field that is outside the rendering of the first section of data.

8. A non-transitory storage device storing instructions operable to cause one or more data processors to perform operations comprising:
generating a rendering of a first section of data and storing the rendering of the first section of data in a first data buffer;
determining a data field that, when rendered, straddles the rendering of the first section of data and a rendering of a second section of data that will be stored in a second data buffer, the data field, when rendered, including a first portion and a second portion, wherein determining that the data field straddles the renderings includes determining that the first portion of the data field, when rendered, is stored in the first data buffer and that the second portion of the data field, when rendered, will be stored in the second data buffer;

generating a rendering of the data field separately from the rendering of the first section of data and the rendering of a second section of data and storing a rendered first portion of the data field and a rendered second portion of the data field in a cache; and generating the rendering of the second section of data, including at least storing the rendered second portion of the data field, as stored in the cache, in the second data buffer.

9. The storage device of claim 8, wherein each of the rendering of the first section of data and the rendering of the second section of data includes a bitmap.

10. The storage device of claim 8, wherein generating the rendering of the first section of data comprises:
retrieving a data item from a database; and
formatting the data item according to a layout, wherein:
the layout comprises an arrangement of one or more data fields for presentation; and
formatting the data item comprises formatting the data item for rendering according to the arrangement of a corresponding data field in the layout.

11. The storage device of claim 8, wherein determining the data field that straddles the rendering of the first section of data and the rendering of a second section of data comprises:
determining a geometry of the rendering of the first section of data and a geometry of the rendering of the data field based on data fetched from a database and a layout for formatting the data; and
determining, based on the geometry of the rendering of the first section of data and the geometry of the rendering of the data field, that the first portion of the data field, when rendered, is inside the first rendering, and that the second portion of the data field, when rendered, is outside the first rendering and is inside the second rendering.

12. The storage device of claim 8, wherein the data field is a repeating data field that corresponds to multiple and separate values.

13. The storage device of claim 8, wherein storing the generated rendering of the data field comprises storing the generated rendering of the data field in a tree data structure that includes a plurality of nodes, wherein a parent node in the tree data structure represents the rendering of the first section of data, and a child node of the parent node represents the rendering of the data field.

14. The storage device of claim 13, the operations comprising:
receiving a change in the first section of data;
identifying the rendering of the data field according to the tree data structure; and
updating the rendering of the data field according to the change, including updating a portion of the rendering of the data field that is outside the rendering of the first section of data.

15. A system comprising:
one or more computer processors; and
a non-transitory storage device storing instructions operable to cause one or more computer processors to perform operations comprising:

generating a rendering of a first section of data and storing the rendering of the first section of data in a first data buffer;

determining a data field that, when rendered, straddles the rendering of the first section of data and a rendering of a second section of data that will be stored in a second data buffer, the data field, when rendered, including a first portion and a second portion, wherein determining that the data field straddles the renderings includes determining that the first portion of the data field, when rendered, is stored in the first data buffer and that the second portion of the data field, when rendered, will be stored in the second data buffer;

generating a rendering of the data field separately from the rendering of the first section of data and the rendering of a second section of data and storing a rendered first portion of the data field and a rendered second portion of the data field in a cache; and generating the rendering of the second section of data, including at least storing the rendered second portion of the data field, as stored in the cache, in the second data buffer.

16. The system of claim 15, wherein each of the rendering of the first section of data and the rendering of the second section of data includes a bitmap.

17. The system of claim 15, wherein generating the rendering of the first section of data comprises:
retrieving a data item from a database; and
formatting the data item according to a layout, wherein:
the layout comprises an arrangement of one or more data fields for presentation; and
formatting the data item comprises formatting the data item for rendering according to the arrangement of a corresponding data field in the layout.

18. The system of claim 15, wherein determining the data field that straddles the rendering of the first section of data and the rendering of a second section of data comprises:
determining a geometry of the rendering of the first section of data and a geometry of the rendering of the data field based on data fetched from a database and a layout for formatting the data; and
determining, based on the geometry of the rendering of the first section of data and the geometry of the rendering of the data field, that the first portion of the data field, when rendered, is inside the first rendering, and that the second portion of the data field, when rendered, is outside the first rendering and is inside the second rendering.

19. The system of claim 15, wherein the data field is a repeating data field that corresponds to multiple and separate values.

20. The system of claim 15, wherein storing the generated rendering of the data field comprises storing the generated rendering of the data field in a tree data structure that includes a plurality of nodes, wherein a parent node in the tree data structure represents the rendering of the first section of data, and a child node of the parent node represents the rendering of the data field.

21. The system of claim 20, the operations comprising:
receiving a change in the first section of data;
identifying the rendering of the data field according to the tree data structure; and
updating the rendering of the data field according to the change, including updating a portion of the rendering of the data field that is outside the rendering of the first section of data.

* * * * *